US008781811B1

(12) United States Patent
Buryak et al.

(10) Patent No.: US 8,781,811 B1
(45) Date of Patent: Jul. 15, 2014

(54) CROSS-APPLICATION CENTRALIZED LANGUAGE PREFERENCES

(75) Inventors: Kirill Buryak, Sunnyvale, CA (US); Andrew Swerdlow, San Francisco, CA (US); Clement Roux, L'Hay-le-Roses (FR); Luke Hiro Swartz, San Francisco, CA (US); Cibu Johny, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 13/278,622

(22) Filed: Oct. 21, 2011

(51) Int. Cl.
*G06F 17/20* (2006.01)

(52) U.S. Cl.
USPC ........ 704/8; 726/7; 725/5; 717/173; 717/105; 715/863; 715/762; 715/265; 709/246; 709/228; 709/227; 707/769; 705/26.41; 705/1.1; 704/4; 704/235; 455/3.04

(58) Field of Classification Search
USPC .......... 709/246, 227, 228; 715/863, 762, 265; 725/5; 707/769; 726/7; 717/105, 173; 705/26.41, 1.1; 704/4, 235; 455/3.04
See application file for complete search history.

(56) References Cited

U.S. PATENT DOCUMENTS

| 6,476,833 | B1 * | 11/2002 | Moshfeghi | 715/854 |
|---|---|---|---|---|
| 7,185,333 | B1 * | 2/2007 | Shafron | 717/173 |
| 2002/0147818 | A1 * | 10/2002 | Wengrovitz | 709/228 |
| 2003/0005159 | A1 * | 1/2003 | Kumhyr | 709/246 |
| 2003/0028390 | A1 * | 2/2003 | Stern et al. | 705/1 |
| 2004/0015408 | A1 * | 1/2004 | Rauen et al. | 705/26 |
| 2004/0056894 | A1 * | 3/2004 | Zaika et al. | 345/762 |
| 2006/0089990 | A1 * | 4/2006 | Ng et al. | 709/227 |
| 2006/0242621 | A1 * | 10/2006 | Ye et al. | 717/105 |
| 2008/0139112 | A1 * | 6/2008 | Sampath et al. | 455/3.04 |
| 2009/0044216 | A1 * | 2/2009 | McNicoll | 725/5 |
| 2009/0178010 | A1 * | 7/2009 | Chaudhri | 715/863 |
| 2010/0286977 | A1 * | 11/2010 | Chin et al. | 704/4 |
| 2010/0306249 | A1 * | 12/2010 | Hill et al. | 707/769 |
| 2012/0017146 | A1 * | 1/2012 | Travieso et al. | 715/265 |
| 2012/0221593 | A1 * | 8/2012 | Trese et al. | 707/769 |
| 2012/0265528 | A1 * | 10/2012 | Gruber et al. | 704/235 |
| 2012/0304265 | A1 * | 11/2012 | Richter et al. | 726/7 |

* cited by examiner

*Primary Examiner* — Michael Colucci
(74) *Attorney, Agent, or Firm* — Morris & Kamlay LLP

(57) ABSTRACT

A process for a language selection using one or more language preferences is disclosed. Information for presenting a language preference selection control may be sent to a user. A language preference may be received from the user and stored to a server. A cookie, which includes an indication of the language preference, may be caused to be stored to a device of a user. The stored language preference may be accessed from the cookie responsive to a communication from the user. Responsive to whether the user has logged into an account, the language preference may be retrieved from either the server or from the cookie. The retrieved language preference may be compared with languages available in an application and a most preferred language for the application may be determined based upon the comparison. Information from the application may be provided to the user in the most preferred language.

23 Claims, 5 Drawing Sheets

FIG. 4

Edit language settings

410

Primary language: English

Secondary language: Russian

Language exceptions

420

Email application: Español  remove

Photo editor: Italiano  remove

Save  Cancel

CROSS-APPLICATION CENTRALIZED LANGUAGE PREFERENCES

BACKGROUND

Web-based or similar software applications that provide for the use of multiple languages by users typically track user language selections using a stored language setting, which may be associated either with a web browser or a user account. Some applications require a user to make a language selection every time the application is requested. Some web applications may automatically select a language based on language indicators such as URL parameters, cookies, browser accept-language, user agent, domain, or IP address. However, these methods do not provide the user's desired language selections across separate applications and computing devices. For example, when an application has stored the user's language preferences in a file on the user's computer or associated the file with the user's web browser, the stored language preferences will not be retrievable if the user uses a different computer or a different program on the same computer in which they are stored. As another example, if a language setting is associated with a user account, applications that can provide content in the selected language may be limited to only those applications that can retrieve language preferences from the user's account, and they may not be able to do so unless the user is logged in to the account. Conventional techniques that automatically select a language based on default parameters, such as a user's IP address, may ignore a user's specific language preferences.

BRIEF SUMMARY

According to an embodiment of the disclosed subject matter, information for presenting a language preference selection control may be sent to a user. A language preference may be received from the user and stored to a server. A cookie, which includes an indication of the language preference, may be stored to a device of a user. The stored language preference may be accessed from the cookie responsive to a communication from the user. Responsive to whether the user has logged into an account, the language preference may be retrieved from either the server or from the cookie. The retrieved language preference may be compared with languages available in an application. A most preferred language for the application may be determined based upon the comparison of the retrieved language preference with the languages available for the application. Information from the application may be provided to the user in the most preferred language.

In an embodiment of the disclosed subject matter, a plurality of language preferences may be received from a user. The language preferences may represent a prioritized list of language preferences specified by the user for a particular application or without regard to a specific application. The plurality of language preferences may be stored to a first computer readable medium, for example a cookie. The plurality of language preferences may be accessed from the first computer readable medium. The plurality of language preferences may be compared with languages available in a first application. A most preferred language for the application may be determined based upon the step of comparing the selected language preferences associated with the user with the languages available for the application. Information from the application may be provided to the user in the most preferred language. Further, a request from a second application may be received. The first computer readable medium or cookie may be accessed and the plurality of language preferences may be compared with languages available in the second application. A most preferred language for the second application may be determined based upon the comparison. Information from the second application may be presented to the user in the most preferred language. The first computer readable medium and a second computer readable medium may be connected to a communications network. It may be determined whether language preferences stored in the first computer readable medium and in the second computer readable medium are substantially similar. Information between the first computer readable medium and the second computer readable medium may be exchanged over the communications network responsive to the step of determining whether the language preferences of the first computer readable medium and the second computer readable medium are substantially similar.

In an embodiment of the disclosed subject matter, a database may store a plurality of language preferences. The language preferences may represent a prioritized list of language preferences specified by the user for a particular application or without regard to a specific application. A processor in connection with said database may be configured to receive a plurality of language preferences from a user and store the plurality of language preferences to a first computer readable medium, for example a cookie. The processor may be configured to access the plurality of language preferences from the first computer readable medium and compare the plurality of language preferences with languages available in a first application. The processor may be configured to determine a most preferred language for the application based upon the step of comparing the selected language preferences associated with the user with the languages available for the application. The processor may be configured to provide information from the application to the user in the most preferred language. Further, the processor may be configured to receive a request from a second application. The first computer readable medium or cookie may be accessed and the plurality of language preferences may be compared with languages available in the second application. A most preferred language for the second application may be determined based upon the comparison. Information from the second application may be presented to the user in the most preferred language. The processor may be configured to receive a request to provide information from the application to the user. The first computer readable medium and a second computer readable medium may be connected to a communications network. It may be determined whether language preferences stored in the first computer readable medium and in the second computer readable medium are substantially similar. Information between the first computer readable medium and the second computer readable medium may be exchanged over the communications network responsive to the step of determining whether the language preferences of the first computer readable medium and the second computer readable medium are substantially similar.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an example of a language preference selection control according to an embodiment of the disclosed subject matter.

DETAILED DESCRIPTION

Embodiments of the presently disclosed subject matter may include a hybrid approach to storing user language preferences based upon the use of both locally- and remotely-stored language preferences and overrides. Language preferences may be stored either on a server or the user's computing device, or on both. For example, when the user first accesses an account, the user may be presented with a language selection control that allows the user to provide one or more languages in which the user wishes to receive content. A language selection control may also refer to a configuration interface. The user also may be provided with a means to indicate application specific overrides. Language preferences that are stored locally or remotely may be updated when the user makes alterations to the desired language preferences. For example, if a user is logged into an account and specifies a new application-specific language override, the new override may be communicated to a locally or remotely stored copy of the language preferences. The locally or remotely stored copy may either be completely replaced or updated to reflect the new override.

In some cases, a user may not be logged into an account associated with the language preferences. In this instance, a language preference for a user may be determined from a locally-stored copy of the language preferences or local computer readable code that can provide access to the language preferences. When the user specifies a new override, the override may be stored locally in a separate file from the local language preferences or in the same file or other location as the local copy of the language preferences. The local copy may then communicate with a remotely located copy of the language preferences, such as a backend server, and update the user's existing language preferences or provide a copy the user's language preferences to the remote location. The language preferences, whether remotely or locally stored, may be associated with the user.

Figure 1:
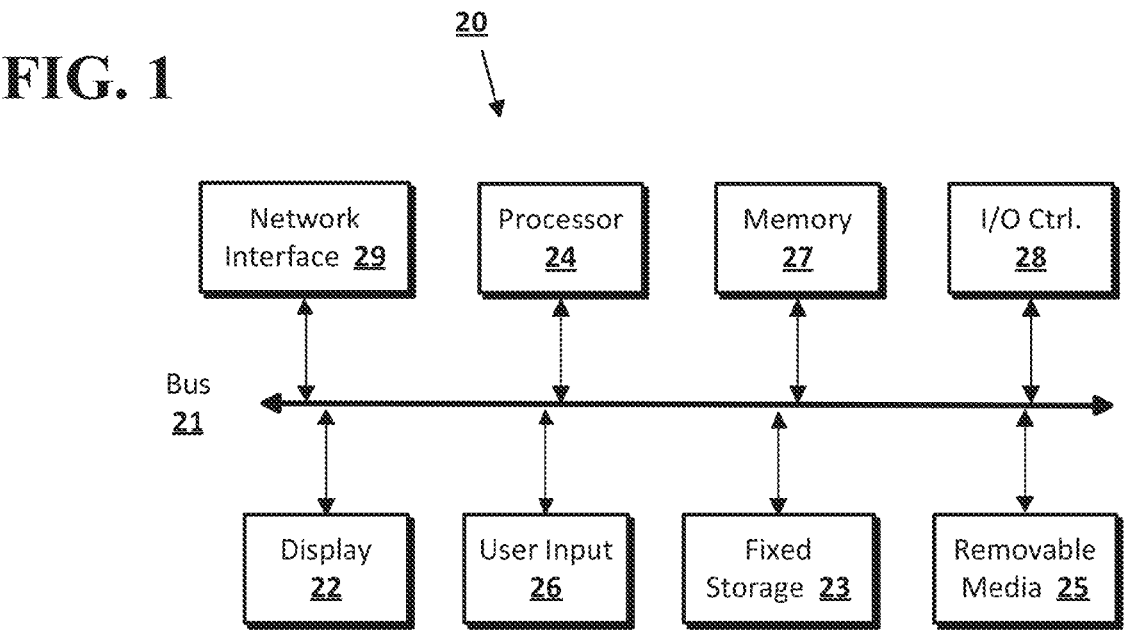
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
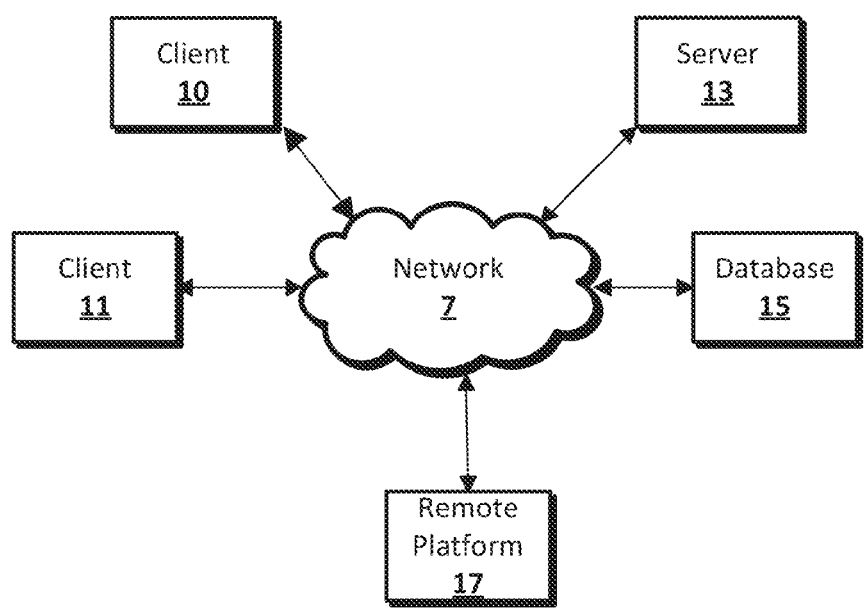
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 3:
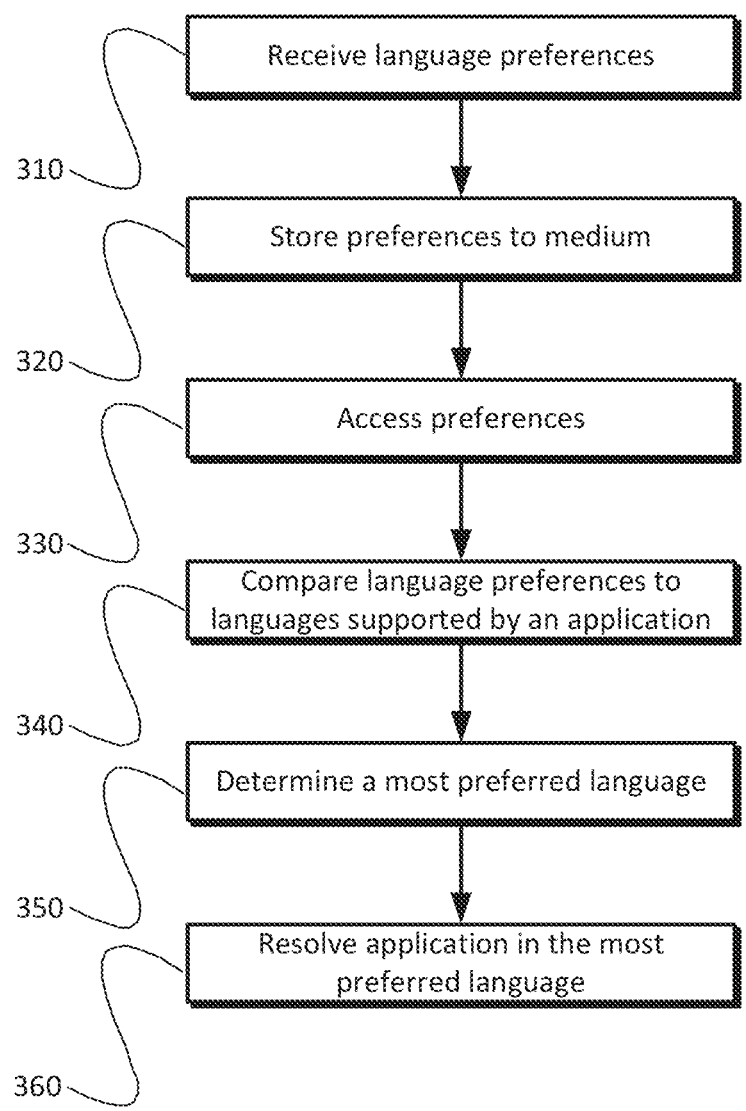
FIG. 3 shows an example arrangement and information flow according to an embodiment of the disclosed subject matter.

In an embodiment of the disclosed subject matter, such as shown in FIG. 3, a plurality of language preferences may be received from a user at 310. General language preferences for the user may specify at least one language that is the user's preferred language choice. The user may provide other languages, and the provided languages may be prioritized based on, for example, the user's discretion and the capability of the application to configure language preferences. The user also may specify application-specific language overrides. A language override may supersede the user's general language preferences, regardless of whether the language preferences have been prioritized by the user. For example, a user may provide a general language preferences list that indicates the user prefers applications to be resolved in the following languages, in order: (1) French, (2) German, and (3) Chinese. These preferences may indicate to an application that the user prefers content be provided in French, if available, and in the German language if the French language is unavailable. If the application cannot be provided in both French and German, then the application may attempt to be resolved in Chinese. The user may override this prioritized list for a separate application, such as an email application. Continuing the example above, the user may prefer the English language for his email application, and the list of 1-3 languages for other applications. Thus, the language preferences may be followed except for the defined exception of the email application, which may then be provided in English.

Referring again to FIG. 3, the plurality of language preferences may be stored, such as to a first computer readable medium, at 320. The language preferences may be stored remotely, locally, or both locally and remotely. For example, a server may provide a remote storage solution, and a user's computing device may provide a local storage site. If the language preferences are to be stored at multiple locations, the order of storing the language preferences may begin with either the local or remote storage site, or the preferences may be stored concurrently at each location. Language preferences may be stored in any suitable format, such as a cookie, text file, or the like. Thus, storage of the language preferences may be independent of location and order.

The plurality of language preferences is accessed from the first computer readable medium at 330. A user's language preferences may be stored and associated with the user's account at a remote location, and, when accessed, may be provided to an application. For example, user language preferences can be maintained on a backend server. The backend server can provide information to an application when the user has logged into an account. The user's language preferences can be made available to any application capable of interacting with the backend server. Thus, the user's language preferences may not be tied to a web browser or specific computer. For example, after logging into an account, the user may access an application for the first time on a new computer and the application can provide content in a language appropriate for the user without any further instruction from the user.

When the user is not logged into an account, the language preferences can be accessed from a locally stored copy, such as a cookie, that can provide language preferences to applications. Alternatively or in addition, language preferences may be provided by an API that interfaces with either or both the backend server and the cookie for applications that are not associated with the one on which the user established an account with language preferences. For example, one application can resolve language settings using an API that accesses a language preferences cookie that was previously stored by a second application. Thus, language resolution can occur using the user language preferences and automatic language selection features, such as IP address; in addition, language resolution can occur regardless of whether the user has logged into an account or is using the same computing device on which language preferences were stored.

In an embodiment of the disclosed subject matter, language preferences can be accessed even if the user has not logged into an account associated with the preferences by accessing a locally stored version of the preferences, such as data stored in a cookie or other local file. In some configurations, the file may not need to contain a copy of the language preferences. For example, the file may include a reference, instruction, or other computer readable code that may access a remote location that contains the language preferences.

Referring again to FIG. 3, the plurality of language preferences may be compared with languages available in a first application at 340. A most preferred language for the application may be determined based upon the step of comparing the selected language preferences associated with the user with the languages available for the application at 350. Information from the application may be provided to the user in the most preferred language. For example, an application may receive a request to provide information, such as graphics or text in the most preferred language.

A further embodiment of the disclosed subject matter may include connecting the first computer readable medium and a second computer readable medium to a communications network. For example, the first computer readable medium may be a cookie stored on a user's device, and the second computer readable medium may be a server located remotely from the first computer readable medium. The server and the user's device may communicate with each other using any appropriate communication protocol and technique. It may be determined whether language preferences stored in the first computer readable medium and in the second computer readable medium are substantially similar. Continuing the example, if a user had not logged into his account but had made language preference selections, those changes may be stored to the cookie on the user's device. The server, however, may be unaware of such changes. A comparison between the server's and user's device's information on the language preferences may enable a determination to be made as to whether either the server or device requires an update. Information may be exchanged between the first computer readable medium and the second computer readable medium over the communications network responsive to the step of determining whether the language preferences of the first computer readable medium and the second computer readable medium are substantially similar. For example, if it is determined that they are not substantially similar, information may be copied from one medium to another, thus updating the other medium.

FIG. 4 displays an example of a language preferences configuration interface. A user may enter language preferences when creating an account. The configuration interface also may be available any time thereafter, in the event the user decides to alter the user's language preferences. The configuration interface shown in FIG. 4 displays two sections in which a user may enter language preferences. The "Edit language settings" feature at 410 may receive a user's general language preferences. Such preferences may be applied to any application associated with the preferences interface, such as all applications provided by a common host or provider, or all applications that make use of a common API or other interface. In the example shown, a user may set a primary and secondary language. Other language configuration pages may allow a user to specify more or fewer languages. Alternatively, a configuration page may allow a user to enter language preferences without prioritizing them. A "Language exceptions" interface 420 may allow a user to specify language overrides to the user's general language preferences. For example, a user account in FIG. 4 has selected Spanish as the preferred language for a mail application, and Italian as the preferred language for a photo editing application. If the user had not specified any Language exceptions 420, then those applications may obey the language preferences as specified in the language settings 410. If a user does not configure language settings, then a default language may be utilized as described herein.

Figure 5:
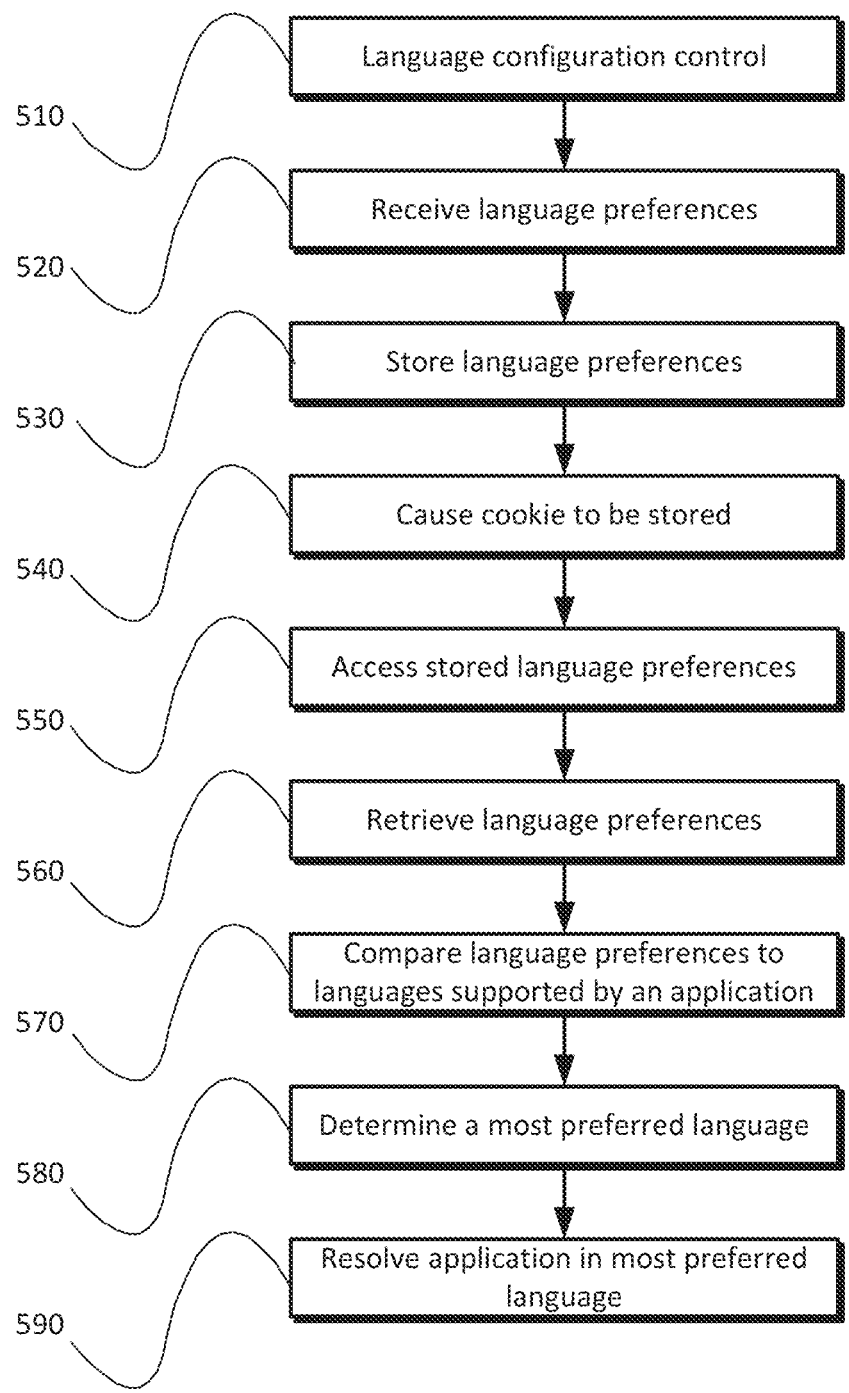
FIG. 5 shows an example of a language selection and resolution of an application according to an embodiment of the disclosed subject matter.

FIG. 5 shows an example of language selection and resolution for an application according to an embodiment of the disclosed subject matter. At 510, a user may be sent information for presenting a language preference selection control. A language preference from the user may be received at 520 and stored to a server at 530. A cookie that may include an indication of the received language preference may be stored at 540. For example, a system according to an embodiment of the disclosed subject matter may cause the cookie to be stored by instructing a user's browser to create and store the cookie. The cookie also may be stored, or an appropriate entity may cause the cookie to be stored, using techniques known in the art. The cookie may include an indication of the received language preference. Subsequently at 550, the stored language preference may be accessed from the cookie responsive to a communication from the user. Responsive to whether the user has logged into an account, the language preference may be retrieved at 560 from either the server or from the cookie, or both. For example, an application may determine that the user has logged in to an account and accordingly may retrieve a stored language preference associated with the user's account from a server or service that manages the account. Similarly, an application may determine that the user is not logged in to an account, and retrieve a language preference from a cookie or other similar location. The retrieved language preference may be compared with languages available in an application at 570. A most preferred language for the application then may be determined at 580 based upon the comparing of the retrieved language preference with the languages available for the application. Information from the application may be provided to the user in the most preferred language 590.

Figure 6:
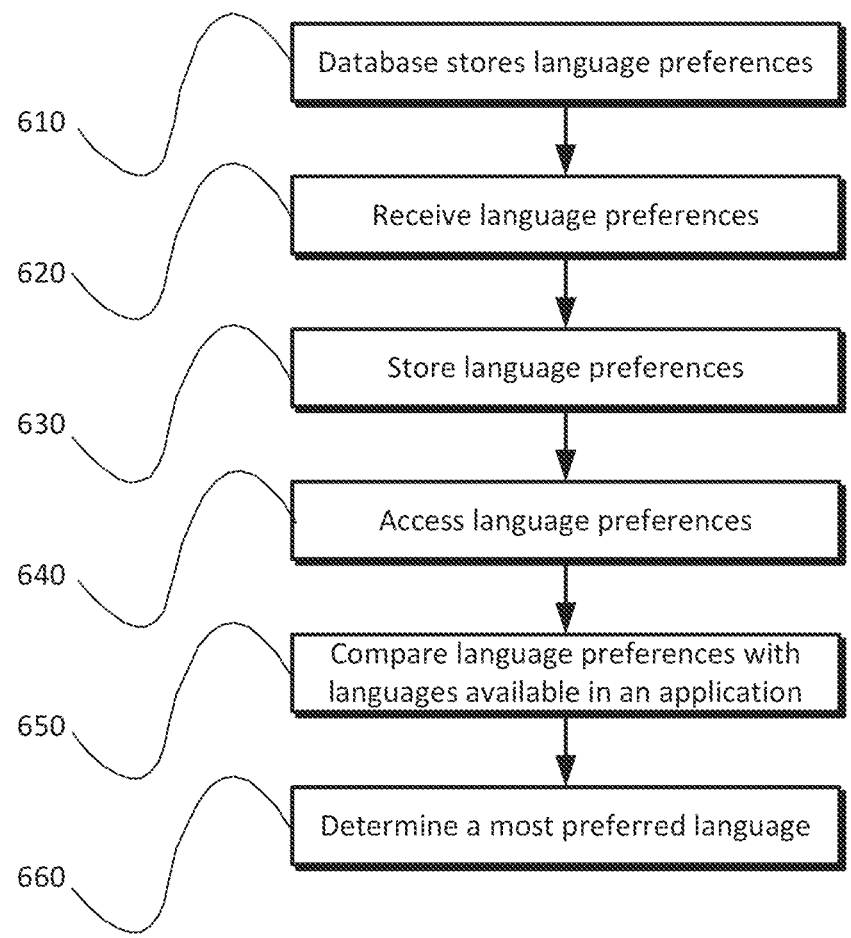
FIG. 6 shows an example process for a language selection using language preferences according to an embodiment of the disclosed subject matter.

FIG. 6 shows an example process for language selection using a language preference according to an embodiment of the disclosed subject matter. At 610, a database may store a plurality of language preferences. A processor in connection with the database may be configured to receive 620, store to first computer readable medium 630, and access from the first computer readable medium 640 a plurality of language preferences. The processor may be configured to compare the plurality of language preferences with language available in the second application at 650 and determine a most preferred language for the application based upon the comparison of the selected language preference associated with the user with the languages available for the application at 660.

In some configurations, in addition to or instead of language preferences and overrides received directly from a user, one or more language indicators may be used to make a language selection. Such language indicators may include, for example, URL parameters, general user language preferences, other cookies and cookie information, a browser accept-language, language overrides for other applications a user agent of an application used to access the application for which the language is being set, an enterprise administrator's language policy setting, and the user's IP address. Languages supported by an application may be compared to the languages available in the various language indicators. Upon encountering the first language indicator that provides a language supported by the application, an application may select a language according to the appropriate language indicator. Thus, if a user has not defined language preferences, an appropriate language may still be provided based upon the language indicators.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:
1. A method comprising:
    receiving, by a server, a first plurality of language preferences from a user;
    storing the first plurality of language preferences to a database connected to the server;

storing the first plurality of language preferences to a first computer readable medium on the first device as a second plurality of language preferences;

receiving, from a first device, a request to resolve a first language preference for a first application, wherein the first application utilizes an API to access the first plurality of language preferences stored to the database;

comparing the first plurality of language preferences to languages available in the first application;

determining a most preferred language for the first application operating on the first device based upon the first comparison of the first plurality of language preferences with the languages available for the first application;

providing an indication of the most preferred language for the first application to the first device;

receiving, from the first device, a request to resolve a second language preference for a second application, wherein the second application cannot obtain the first plurality of language preferences stored to the database;

obtaining the second plurality of language preferences from the first computer readable medium of the first device;

determining a most preferred language for the second application on the first device based upon a second comparison of the second plurality of language preferences to languages available for the second application; and providing an indication of the most preferred language for the second application to the first device.

2. The method of claim 1, wherein the plurality of language preferences represents a prioritized list of language preferences.

3. The method of claim 1, wherein the first computer readable medium comprises a cookie.

4. The method of claim 1, further comprising:

receiving a request from the second application operated from a second device, wherein the second device has stored the first plurality of language preferences to a second computer readable medium as a third plurality of language preferences;

determining that the second application operating on the second device cannot access the first plurality of language preferences;

obtaining the third plurality of language preferences from the second computer readable medium of the second device;

determining a most preferred language for the second application operating on the second device based upon a third comparison of the third plurality of language preferences to languages available for the second application; and providing an indication of the most preferred language for the second application to the second device.

5. The method of claim 1, further comprising receiving a request to provide information from the first application to the user.

6. The method of claim 1, further comprising receiving at the first application a request to provide information from the first application to the user.

7. The method of claim 1, further comprising:

determining the first plurality of language preferences differs from the second plurality of language preferences stored to the first computer readable medium;

determining whether the first plurality of language preferences or the plurality of language preferences stored to the first computer readable medium requires an update; and updating the plurality of language preferences responsive to the determination of whether the server or the first device requires the update.

8. A system comprising:

a database configured to store a first plurality of language preferences;

a processor in connection with said database, said processor configured to:

receive a first plurality of language preferences from a user;

store the first plurality of language preferences to the database;

store the first plurality of language preferences to a first computer readable medium on the first device as a second plurality of language preferences;

receive, from a first device, a request to resolve a first language preference for a first application, wherein the first application utilizes an API to access the first plurality of language preferences stored to the database;

compare the first plurality of language preferences to languages available in the first application;

determine a most preferred language for the first application operating on the first device based upon the comparison of the first plurality of language preferences stored to the database with the languages available for the first application;

provide an indication of the most preferred language for the first application to the first device;

receive, from the first device, a request to resolve a second language preference for a second application, wherein the second application cannot obtain the first plurality of language preferences stored to the database;

obtain the second plurality of language preferences from the first computer readable medium of the first device;

determine a most preferred language for the second application on the first device based upon a second comparison of the second plurality of language preferences to languages available for the second application; and provide an indication of the most preferred language for the second application to the first device.

9. The system of claim 8, wherein the plurality of language preferences represents a prioritized list of language preferences.

10. The system of claim 8, wherein the first computer readable medium comprises a cookie.

11. The system of claim 8, further configured to:

receive a request from the second application operated from a second device, wherein the second device has stored the first plurality of language preferences to a second computer readable medium as a third plurality of language preferences;

determine that the second application operating on the second device cannot access the first plurality of language preferences;

obtain the third plurality of language preferences from the second computer readable medium of the second device;

determine a most preferred language for the second application operating on the second device based upon a third comparison of the third plurality of language preferences to languages available for the second application; and provide an indication of the most preferred language for the second application to the second device.

12. The system of claim 8, further configured to receive a request to provide information from the first application to the user.

13. The system of claim 8, further configured to receive at the first application a request to provide information from the first application to the user.

14. The system of claim 8, further configured to:
- determine the first plurality of language preferences stored to the database differs from the second plurality of language preferences stored to the first computer readable medium;
- determine whether the first plurality of language preferences stored to the database or the second plurality of language preferences stored to the first computer readable medium requires an update; and
- update the first plurality of language preferences or the second plurality of language preferences responsive to the determination of whether the database or the first device requires an update.

15. A system, comprising:
- a server comprising a first computer readable medium and a first processor configured to:
  - obtain a plurality of language preferences from a first device; and
  - store the plurality of language preferences to the first computer readable medium;
- the first device comprising a second computer readable medium and a second processor configured to:
  - receive the plurality of language preferences from the server over a first network connection;
  - store the plurality of language preferences to the second computer readable medium;
  - execute a first application that is unable to access the plurality of language preferences associated with the server;
  - access plurality of language preferences stored on the second computer readable medium; and
  - resolve the first application according to the plurality of language preferences stored on the second computer readable medium; and
- a second device comprising a third computer readable medium and a third processor configured to:
  - receive the plurality of language preferences from the server over a second network connection;
  - store the plurality of language preferences to the third computer readable medium;
  - execute a second application that is unable to access the plurality of language preferences associated with the server;
  - access the plurality of language preferences stored on the third computer readable medium; and
  - resolve the second application according to the plurality of language preferences stored on the third computer readable medium.

16. The system of claim 15, wherein the first network connection and the second network connection are identical.

17. The system of claim 15, wherein the first application and the second application are identical application.

18. The system of claim 15, wherein the first computer readable medium comprises a database.

19. The system of claim 15, the first processor further configured to:
- determine the plurality of language preferences stored to the first computer readable medium differ from the plurality of language preferences stored to the second computer readable medium and requires an update;
- updating the plurality of language preferences-responsive to the determination that the plurality of language preferences stored to the first computer readable medium differs from the plurality of language preferences stored to the second computer readable medium.

20. The system of claim 19, the third processor further configured to obtain an updated plurality of language preferences from the server, where the plurality of language preferences stored to the server, the first device, and the second device are identical.

21. The system of claim 15, wherein the plurality of language preferences stored to the first computer readable medium are accessible only when a user is logged into an account associated with the plurality of language preferences.

22. The system of claim 21, wherein the plurality of language preferences stored to the second computer readable medium are accessible only when the user is not logged into the account associated with the plurality of language preferences stored to the first compute readable medium.

23. The method of claim 1, wherein the first application is executed locally on the first device.

* * * * *